(No Model.)
R. W. TRAYLOR.
MACHINE FOR REDUCING MICA FOR THE MANUFACTURE OF STARCH, &c.
No. 263,630. Patented Aug. 29, 1882.
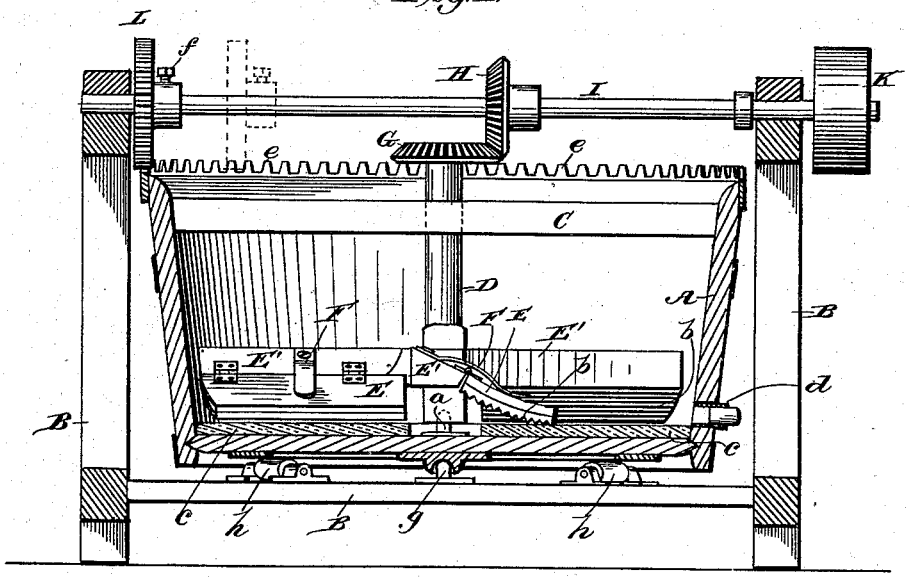
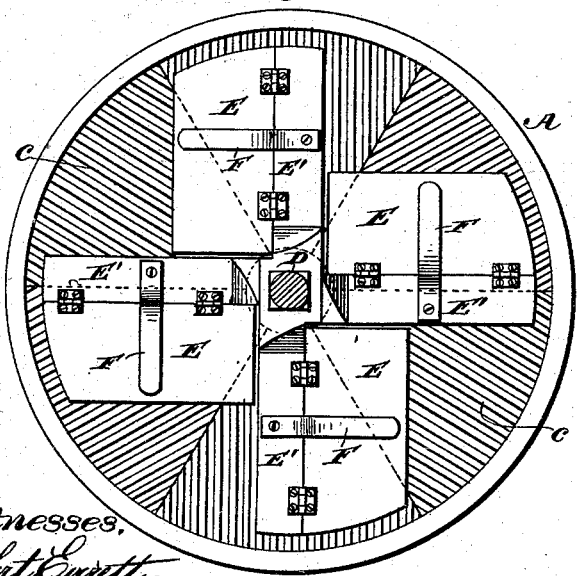
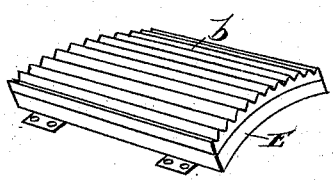
Witnesses,
Robt Everett
J. A. Rutherford
Inventor,
Robert W. Traylor.
By James L. Norris.
Atty.

UNITED STATES PATENT OFFICE.

ROBERT W. TRAYLOR, OF RICHMOND, VIRGINIA, ASSIGNOR TO NATHAN D. HARGROVE, OF SAME PLACE.

MACHINE FOR REDUCING MICA FOR THE MANUFACTURE OF STARCH, &c.

SPECIFICATION forming part of Letters Patent No. 263,630, dated August 29, 1882.

Application filed March 15, 1882. (No model.)

*To all whom it may concern:*

Be it known that I, ROBERT W. TRAYLOR, a citizen of the United States, residing at Richmond, in the county of Henrico and State of Virginia, have invented new and useful Improvements in Machines for Reducing Mica for the Manufacture of Starch for Laundry and other Purposes, of which the following is a specification.

The object of my invention is to provide an apparatus for reducing mica to a finely-powdered condition. This object is accomplished by the mechanism illustrated in the annexed drawings, in which—

Figure 1 is a vertical section of my improved apparatus for treating mica and similar material. Fig. 2 is a plan of the same, and Fig. 3 is a bottom view of one of the upper rotating rubbers.

Like letters of reference designate the same parts in the several views.

My apparatus for treating mica for the purpose of reducing it to a state of minute division consists of a vat or vessel, A, which is preferably of a circular form and supported in a suitable frame, B, in any appropriate manner. This vat is provided near the top with a cross-piece or bearing, C, in which is journaled a spindle, D, that is arranged vertically in the center of the vat, its lower end being recessed for the reception of a pin or pivot, $a$, upon which the spindle is caused to turn. The spindle D is provided at its lower end with the rubbing-blocks E E', preferably four in number, which are arranged at right angles to each other, as shown in Fig. 2. These blocks may be made in sections, one of which, E', is attached rigidly to the spindle and provided with a spring, F, adapted to bear upon the top of the hinged portion E so as to hold it to contact with the material under treatment and yet permit said hinged portion to rise and pass over any enlarged or hardened masses of material; or each rubbing-block, if preferred, may be formed in one piece of sufficient weight and be loosely attached to the spindle, so as to rise upon the same independent of each other if brought in contact with large masses of material while in operation. The lower faces of the blocks E are provided with a covering, $b$, formed of corrugated soft rubber, which is adapted to have a rubbing action, in conjunction with a corrugated rubber surface, $c$, in the bottom of the vat, on the mica or similar material that is placed between said rubbing-surfaces. The outer ends of the blocks E are curved or rounded to conform to the form of the vat, within which they are caused to operate. A rapid rotation in a horizontal plane is imparted to these adjustable rubbing-blocks by means of suitable mechanism for revolving the spindle D, said spindle being provided at its upper end with a bevel-gear, G, that meshes with a similar gear, H, attached to a horizontal shaft, I, which is journaled in bearings formed in the frame B and provided with a pulley, K, by which it is revolved.

It will be observed that the corrugations or ridges formed in the rubber or elastic covering $b$, attached to the lower faces of the rubbing-blocks E, extend longitudinally thereof, as shown in Fig. 3, while the corrugations formed in the similar rubber covering or surface $c$, attached in the bottom of the vat A, are disposed radially. This rubber surface or covering $c$, that is secured in the bottom of the vat, is preferably made in sections, having the segmental form shown in Fig. 2, so that the lines of corrugations formed thereon may be readily arranged in such a manner as will secure a perfect and uniform coaction of the opposed corrugated rubbing-surfaces. By this means the micaceous material acted upon will be thoroughly and repeatedly split and disintegrated, and be rapidly reduced to the state of minute division or fine powder that is essential to its perfect and effective incorporation with ordinary starch and other like material in the manufacture of mica-starch for laundry and similar purposes.

In practice the mica, in the form of lumps, or, preferably, scraps, is placed within the vat, together with a sufficient quantity of water to assist in its disintegration under the action of the rotating rubbers. It will be seen that as the rubbing-surfaces are caused to rotate the mica is operated upon so as to crush, split, and disintegrate the same, thereby reducing it rapidly and effectively to the state of a fine powder, which may be drawn off, together with the water contained in the vat, through an opening, $d$, provided for the purpose. The rotating blocks E, as before explained, are so constructed as to rise or yield slightly when brought forcibly in contact with hardened or enlarged portions of mica, thereby preventing injury to the said rubbing blocks or surfaces.

If desired, the vat A may be stationary, or it may be adapted to rotate in a direction opposite to that in which the rubbing-blocks E are operated. This is effected by providing the upper edge of the vat with a circular rack, $e$, arranged to gear with a spur-wheel, L, that is adjustably journaled on the shaft I, said wheel having a collar provided with a set-screw, $f$, by means of which the wheel may be adjusted upon the shaft in or out of gear with the rack, and thereby rotate the vat or permit it to remain stationary, as may be preferred. When intended to remain permanently in a stationary condition the rack $e$ will be dispensed with, as shown in Fig. 2, and when the vat is designed to be rotated it will be mounted upon a central pivot, $g$, and supported within its frame on rollers $h\ h$, as shown in Fig. 1. The advantage of rotating the vat with the rubbing-surface $c$, as well as the upper rubbers or blocks, E, will be apparent, but, as before observed, this method of operation may be dispensed with, if desired.

The finely-powdered mica, which is prepared as above described, is designed especially for use in the manufacture of what I term "mica-starch," or an article composed mainly of powdered mica and ordinary starch, said compound being adapted to impart a pearly gloss or luster to laundried fabrics. I have also found by experiment that when this pulverized mica is mixed with starch, gum-arabic and hot water and the solution applied to the inside of paper boxes it will make the same oil-proof, a paper box so treated being capable of holding oil or grease without permitting the same to penetrate. An oil-proof coating may thus be readily and cheaply applied to surfaces of paper, leather, wood, and like material to prevent the same from absorbing grease and oils placed in contact therewith, and will be particularly useful for coating vessels or packages composed of such material, so that they may be adapted for holding grease and oil of any kind.

What I claim is—

1. In the art of manufacturing the starch, the combination, with a vat having its bottom provided with a corrugated surface composed of rubber or like material, of a number of rubbing-blocks provided with corrugated rubber surfaces and attached to a spindle journaled in said vat, whereby the said rubbing-blocks are adapted to be rotated in a horizontal plane within said vat and in contact with the material acted on, substantially as described.

2. In an apparatus for reducing mica to a finely-powdered condition in the manufacture of starch-gloss, the combination, with a vat having a rubbing-surface composed of radial corrugations, of a number of rubbing-blocks arranged adjustably within said vat and having longitudinal corrugations and mechanism for rotating said rubbing-blocks in a horizontal plane, substantially as described.

3. In an apparatus for treating mica in the manufacture of starch-gloss, the combination, with a circular vat supported in a suitable frame and having a rubbing-surface composed of corrugations disposed in radial lines, of a vertical spindle journaled centrally within said vat, a number of automatically-adjustable rubbing-blocks attached to said spindle and provided with longitudinal corrugations, and mechanism for simultaneously rotating said vat and rubbing-blocks in opposite directions, substantially as described.

4. In an apparatus for treating mica for the manufacture of starch-gloss and oil-proof compositions, the combination, with a circular vat supported upon a pivot and rollers in a suitable frame and provided with a rack-gear, an outlet-tube, and a corrugated rubbing-surface, of a spindle journaled centrally within said vat and provided with a bevel-gear, a number of adjustable corrugated rubbing-blocks attached to said spindle, and a horizontal shaft journaled in the supporting-frame and provided with a pulley, a bevel-gear, and an adjustable spur-gear, substantially as described.

In testimony whereof I have hereunto set my hand in the presence of two subscribing witnesses.

R. W. TRAYLOR.

Witnesses:
ALBERT H. NORRIS,
JAMES A. RUTHERFORD.